United States Patent [19]

Rectenwald et al.

[11] 4,092,403
[45] May 30, 1978

[54] PROCESS FOR THE PURIFICATION OF BY-PRODUCT HYDROGEN CHLORIDE STREAMS

[75] Inventors: Charles Edward Rectenwald, Scott Depot; Henry Bishop Hinckley, St. Albans, both of W. Va.

[73] Assignee: Union Carbide Corporation, New York, N.Y.

[21] Appl. No.: 713,681

[22] Filed: Aug. 12, 1976

[51] Int. Cl.² .................. C01B 7/08; B01D 53/34
[52] U.S. Cl. ........................... 423/488; 423/240; 260/544 F
[58] Field of Search ............. 423/240, 241, 245, 416, 423/481, 488, 483; 260/544 F

[56] References Cited

U.S. PATENT DOCUMENTS 3,789,580   2/1974   Allemang et al. ............... 55/71

OTHER PUBLICATIONS

Moeller, "Inorganic Chemistry", John Wiley & Sons, New York, 1952, pp. 689–690.

*Primary Examiner*—Earl C. Thomas
*Attorney, Agent, or Firm*—Richard C. Stewart

[57] ABSTRACT

A process is disclosed for the purification of a by-product hydrogen chloride stream containing fluoride impurities including carbonyl fluorides comprising contacting said stream with activated alumina maintained at a temperature of at least 55° C. to adsorb said impurities.

8 Claims, 8 Drawing Figures

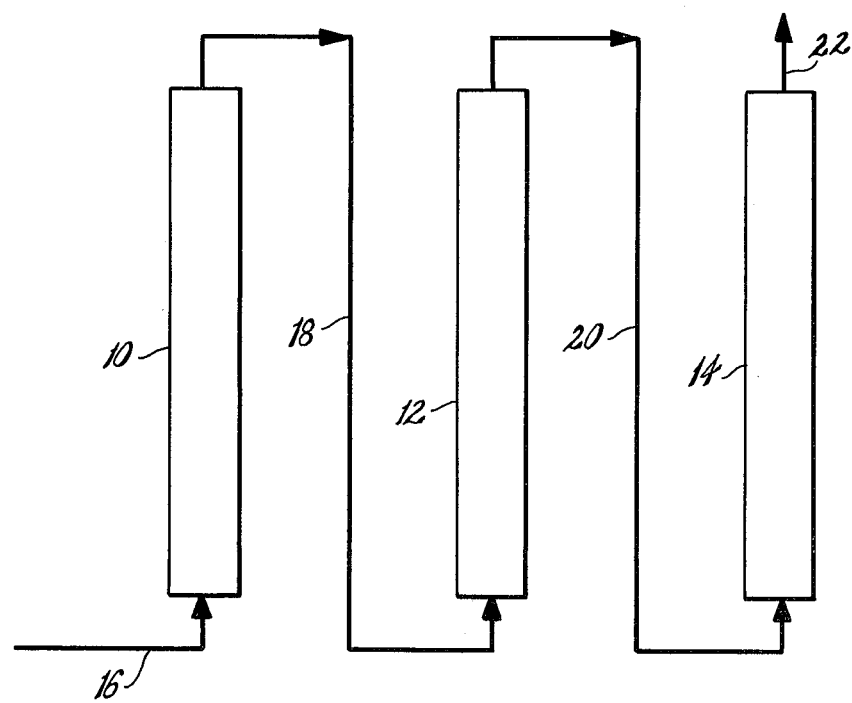

PROCESS FOR THE PURIFICATION OF BY-PRODUCT HYDROGEN CHLORIDE STREAMS

The present invention relates to a process for the purification of by-product hydrogen chloride streams.

The presence of fluoride impurities in by-product hydrogen chloride from fluorocarbon processes makes this potentially valuable raw material unsuitable for use in many processes. Removal of these impurities is therefore desirable as a means of upgrading such by-product to a usable material. Use of activated alumina for removing hydrogen fluoride from hydrogen chloride has been known for many years. Until recently, it was believed that hydrogen fluoride was the major fluoride impurity present in hydrogen chloride derived from fluorocarbon production.

During a past program to study the capacity of activated alumina for removing hydrogen fluoride from plant by-product hydrogen chloride, it was discovered that atmospheric temperature changes had a noticeable effect on the efficiency of activated alumina in removing the fluorides. It was recently demonstrated that changes in temperature did not have a significant effect on the efficiency of activated alumina in removing hydrogen fluoride from a synthetic hydrogen chloride feed mixture. Removal of hydrogen fluoride was about 98% complete over the entire temperature range. However, when by-product hydrogen chloride from a producing fluorocarbon unit was passed over the same bed of alumina it was observed that fluoride removal was only about 50 percent complete at lower temperatures but increased to 96 percent when the temperature was raised. It was, therefore, concluded that fluorides other than hydrogen fluoride were present in the by-product hydrogen chloride. The by-product hydrogen chloride was analyzed for identification and it was discovered that the fluoride present in the by-product hydrogen chloride analyzed was predominantly carbonyl fluoride, with relatively minor amounts of carbonyl chloride fluoride and hydrogen fluoride.

Further work indicated that carbonyl fluorides and other fluorides can be removed from such by-product hydrogen chloride streams.

In accordance with the present invention, a process is provided for the purification of a by-product hydrogen chloride stream containing fluoride impurities including carbonyl fluoride comprising contacting said stream with low-silica containing activated alumina maintained at a temperature of at least 55° C. to simultaneously adsorb said fluoride impurities, and recovering the purified hydrogen chloride so separated.

The activated alumina employed in the process of the invention can be in any desired form, such as granular, spherical, pelletized or powdered. Low-silica aluminas with a high specific surface area are preferred, although less efficient activated aluminas such as bauxite can be employed. High silica aluminas are less desirable because they cause the formation of silicon tetrafluoride which is difficult to remove. Calcined aluminas are unsatisfactory because of their low specific surface area and low activity in adsorbing hydrogen fluoride.

While temperature is not an important factor in the adsorption of hydrogen fluoride on activated alumina, a temperature of at least about 55° C., and preferably about 100°–200° C., should be employed for the removal of carbonyl fluoride. Temperatures above 200° C. can be employed, but offer no particular advantage.

Pressures above or below atmospheric pressure may be employed. Pressure in the range between 100 and 300 psig is preferred because, at higher pressures, more expensive equipment is required and, at lower pressures, larger equipment would be required to provide the desired residence time.

The activated alumina employed in the process of the present invention is a highly porous and adsorptive form of aluminum oxide which is sold commercially in various forms by a number of manufacturers under various designations, e.g., by Alcoa as F-1 Alumina and by Reynolds Company as RA-3 Alumina. As is well known to those skilled in the art, activated alumina is produced by a controlled heating of a hydride to a temperature sufficiently high to drive off most of the water of hydration.

The single FIGURE of the drawing sets forth schematically a representation of apparatus suitable for carrying out the process of the invention in a three-stage operation.

As there shown, three adsorptive columns, 10, 12 and 14, are arranged to be fed in series. The by-product hydrogen chloride stream is bottom fed, through suitable pressure and flow control means (not shown) through line 16 into the first adsorption column 10 which is packed with activated alumina and maintained at a temperature above 55° C. Carbonyl fluoride-containing impurities are adsorbed into the activated alumina bed to reduce the impurity content of the gaseous stream which passes from the column 10 through line 18 to bottom feed the second state column 12 which is similarly packed with a bed of activated alumina. Further impurity removal is effected in column 12 and the outlet gas stream is passed, by bottom feeding, through line 20 to the third adsorption column 14. The gas stream exiting from column 14 through line 22 is substantially free of carbonyl fluoride containing impurities.

In examples of the practice of the process of the present invention, a feed of by-product hydrogen chloride, obtained from a fluorocarbon process unit, was processed in a single-column adsorber apparatus.

The adsorber was fabricated from a section of stainless steel pipe (1 in. × 5 ft.), with a steel pipe jacket over 48 inches of its length. A concentrically located thermowell (three-eighths in. O.D.) extended from the top, to within six inches of the bottom. Approximately 500 cc of Alcoa F-1 alumina was charged to the adsorber, providing a bed 40 inches long. Provisions were made for cooling the jacket with water, or heating with steam.

The Alcoa F-1 alumina (500 cc), employed as the fluoride adsorbent, had the following typical specifications:

| | |
|---|---|
| Mesh size | 4 × 8 |
| Form | granular |
| Surface area $m^2/g$ | 210 |
| Bulk density (loose) $lb/ft^3$ | 52 |
| $Al_2O_3$, % | 92.0 |
| $Na_2O$, % | 0.9 |
| $Fe_2O_3$, % | 0.08 |
| $SiO_2$, % | 0.09 |
| Loss of ignition (1100° C.) | 6.5 |

The alumina was pretreated with a mixture of nitrogen and hydrogen chloride, while passing cooling water through the jacket. The temperature in the bed was held below 100° C. by stopping the HCl feed when the temperature in the bed exceeded 90° C. About 45 minutes were required for the exotherm to progress through the bed.

Hydrogen chloride was fed from a cylinder through a pressure regulator into the bottom of the adsorber. The effluent from the top of the adsorber was led through a calibrated rotometer and a control valve. At regular intervals, samples of the feed and the effluent were adsorbed in a mixture of ice and water. The samples were analyzed for total acidity by titration with caustic. Fluoride determinations were made with an Orion specific ion electrode, using the known addition procedure described in the literature. Values for fluoride, given in Table I, are in ppm by weight, based on HCl.

TABLE I normal sodium hydroxide. Fluoride analyses were made. Values for fluoride given in the tables are in ppm by weight, based on hydrogen chloride.

Analyses for moisture in hydrogen chloride were made.

Each adsorber contained approximately 9000 grams (9900 cc) of Alcoa F-1 alumina having the following typical properties:

| | |
|---|---|
| $Al_2O_3$, % | 92.0 |
| $Na_2O$, % | 0.9 |
| $Fe_2O_3$, % | 0.08 |
| $SiO_2$, % | 0.09 |
| Loss of ignition (1100° C.) % | 6.5 |
| Form | granular |
| Mesh size | 4 × 8 |
| Surface area, $M^{2/g}$ | 210 |
| Bulk density (loose) $lb/ft^3$ | 52 |

The test data was obtained as set forth in Table II.

TABLE II[a]

Removal of Fluorides from Hydrogen Chloride by Adsorption on Alcoa F-1 Alumina
(3, 4 inch by 48 inch beds in series)

| Total Hours on Stream | | | HCl Feed | | | | Adsorbers 1, 2 and 3 | | | Adsorber #2 | | | Adsorber #3 | |
|---|---|---|---|---|---|---|---|---|---|---|---|---|---|---|
| #1 Bed | #2 Bed | #3 Bed | Pressure psig | Chart Lines | Rate CFH | F— ppm | Pressure psig | Δp inches $H_2O$ | Temp. °C | F— ppm | Eff. %[b] | $H_2O$ ppm | F— ppm | Eff. %[b] | F— ppm | Eff. %[b] |
| 438 | 165 | 26 | 170 | 50 | 104 | 122 | 120 | 8 | 60–105 | 3.0 | 97.5 | — | 3.3 | 97.3 | 1.4 | 98.8 |
| 442 | 169 | 30 | 170 | 50 | 104 | 249 | 120 | 9 | 60–108 | 3.7 | 99.3 | — | 1.8 | 99.3 | 1.9 | 99.2 |
| 446 | 173 | 34 | 170 | 50 | 104 | 331 | 120 | 9 | 62–85 | 5.6 | 98.3 | — | 2.7 | 99.2 | 2.6 | 99.2 |

[a]Corrosion rates for steel, nickel and monel were less than 0.001 IPY at temperatures below 25° C. (149 hour exposure).
[b]Efficiency represents the total amount of fluoride removed, based on the feed entering #1 absorber.
[c]High and low temperature for the three beds.

Adsorption of HF on Alcoa F-1 Alumina, 4 × 8 mesh
(1 inch × 40 inch bed, 500 cc vol)

| Time on Stream, hrs | Temp., °C | Pressure, psig | Feed moles/hr | Feed F— ppm | Product F— ppm | Eff., % |
|---|---|---|---|---|---|---|
| 19.0 | 24 | 30 | 2.1 | 436 | 213 | 51.1 |
| 20.0 | 24 | 30 | 2.1 | 438 | 217 | 50.4 |
| 20.5 | 105 | 30 | 2.1 | 426 | 16 | 96.2 |
| 21.0 | 105 | 30 | 2.1 | 437 | 17 | 96.1 |
| 21.8 | 105 | 30 | 2.1 | 429 | 17 | 96.0 |

In further examples of the process of the invention, a three-column adsorption process was employed. A flowsheet showing the three 4-inch by 4½ foot adsorption columns connected in series is shown in the drawing. This unit was connected so as to receive hydrogen chloride directly from the HCl still of a fluorocarbon unit. The discharge from the adsorbers was introduced into an effluent line.

Prior to pressuring the adsorbers to the desired operating pressure, each bed of alumina was treated with a mixture of nitrogen and hydrogen chloride at about 30 psig until the adsorption exotherm passed through the bed. This required three or four hours because no provision was made for removing heat, other than by air cooling. During this treatment, maximum temperatures in the bed were held below 250° C. by feeding hydrogen chloride intermittently. After the exotherm passed through the bed the nitrogen feed was discontinued and the system was pressured with hydrogen chloride to 120 psig. The feed controller was set for the desired feed rate. Samples for total acidity and fluoride analyses were collected by passing a gas stream into a mixture of cracked ice and distilled water in a 1-quart polyethylene bottle. Samples taken for water analyses were collected in specially dried stainless steel cylinders.

Aqueous samples were analyzed for total acidity (calculated as hydrogen chloride) by titration with 0.5

What is claimed is:

1. A process for the purification of a by-product hydrogen chloride stream containing fluoride impurities including carbonyl fluoride, comprising contacting said stream with low-silica containing activated alumina maintained at a temperature of at least 55° C. to simultaneously adsorb said fluoride impurities, and recovering the purified hydrogen chloride so separated.

2. A process in accordance with claim 1, wherein said alumina is maintained at a temperature between about 100° and 200° C.

3. A process in accordance with claim 1, wherein said alumina is maintained at a pressure between about 100 and 300 psig.

4. A process in accordance with claim 1, wherein a plurality of contacting beds of alumina are maintained in series under said temperature conditions.

5. A process for the purification of a by-product hydrogen chloride stream containing at least two fluoride impurities selected from the group consisting of carbonyl fluoride, carbonyl chloride fluoride and hydrogen fluoride comprising contacting said stream with low-silica containing activated alumina maintained at a temperature of at least 55° C. to simultaneously adsorb said fluoride impurities, and recovering the purified hydrogen chloride so separated.

6. A process in accordance with claim 5, wherein said alumina is maintained at a temperature between about 100° and 200° C.

7. A process in accordance with claim 5, wherein said alumina is maintained at a pressure between about 100 and 300 psig.

8. A process in accordance with claim 5, wherein a plurality of contacting beds of alumina are maintained in series under said temperature conditions.

* * * * *